(12) United States Patent
Lee et al.

(10) Patent No.: US 9,341,239 B2
(45) Date of Patent: May 17, 2016

(54) DOUBLE CLUTCH TRANSMISSION

(71) Applicant: Hyundai Motor Company, Seoul (KR)

(72) Inventors: Sueng Ho Lee, Seoul (KR); Chang Wook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 164 days.

(21) Appl. No.: 14/095,601

(22) Filed: Dec. 3, 2013

(65) Prior Publication Data

US 2014/0157923 A1 Jun. 12, 2014

(30) Foreign Application Priority Data

Dec. 10, 2012 (KR) .......... 10-2012-0143099

(51) Int. Cl.
*F16H 3/08* (2006.01)
*F16H 3/00* (2006.01)
(Continued)

(52) U.S. Cl.
CPC ........ *F16H 3/08* (2013.01); *F16H 3/006* (2013.01); *B60K 2006/4816* (2013.01); *B60K 2006/4825* (2013.01); *F16H 3/093* (2013.01); *F16H 2003/0822* (2013.01); *F16H 2003/0931* (2013.01); *F16H 2061/0433* (2013.01); *F16H 2200/0056* (2013.01); *Y02T 10/6252* (2013.01); *Y02T 10/6256* (2013.01); *Y02T 10/76* (2013.01); *Y10T 74/19228* (2015.01)

(58) Field of Classification Search
CPC ............. F16H 3/08; F16H 2003/0822; F16H 2003/0826; F16H 3/085; F16H 3/093; F16H 2200/0056; F16H 2003/09312; F16H 2003/0933; F16H 2061/0433; F16H 2061/0429; B60K 2006/4808; B60K 2006/4825; B60K 2006/4816; Y10T 74/19228; Y02T 10/6256; Y02T 10/6252; Y02T 10/76
USPC .............. 74/325, 329, 330, 331, 661
See application file for complete search history.

(56) References Cited

U.S. PATENT DOCUMENTS 6,634,247 B2 * 10/2003 Pels .......... B60K 6/26
477/6
6,887,180 B2 5/2005 Pels et al.
(Continued)

FOREIGN PATENT DOCUMENTS

| JP | 2002-340170 A | 11/2002 |
| JP | 2010-162924 A | 7/2010 |
| KR | 10-1063506 B1 | 9/2011 |

*Primary Examiner* — William Kelleher
*Assistant Examiner* — Bobby Rushing, Jr.
(74) *Attorney, Agent, or Firm* — McDermott Will & Emery LLP

(57) ABSTRACT

A double clutch transmission includes a variable connector including a first clutch and a second clutch and outputting engine torque through the first and second clutches. An input driver includes a first input shaft connected to the engine with a plurality of input gears disposed on an exterior circumference thereof. A second input shaft is connected to the engine with a plurality of input gears disposed on an exterior circumference thereof. A speed output driver includes a first output shaft disposed in parallel with the input shafts, a first speed output disposed on the first output shaft with first and second synchronizers, a second output shaft disposed in parallel with the first and second input shafts, and a second speed output disposed on the second output shaft with third and fourth synchronizers. A reverse speed/motor driver is disposed between the input device and the speed output device.

17 Claims, 4 Drawing Sheets

(51) Int. Cl.
*F16H 3/093* (2006.01)
*B60K 6/48* (2007.10)
*F16H 61/04* (2006.01)

(56) References Cited

U.S. PATENT DOCUMENTS

| | | | | |
|---|---|---|---|---|
| 7,249,537 B2* | 7/2007 | Lee | ........................... | B60K 6/36 74/661 |
| 8,050,830 B2* | 11/2011 | Komeda | ................. | B60K 6/387 701/51 |
| 8,608,615 B2* | 12/2013 | Fuechtner | ................ | B60K 6/48 477/3 |
| 8,622,862 B2* | 1/2014 | Koyama | ................... | B60K 6/36 180/65.21 |
| 8,714,040 B2* | 5/2014 | Oh | ........................... | F16H 3/093 74/325 |
| 8,931,371 B2* | 1/2015 | Xie | ........................... | B60K 6/48 74/665 A |
| 2011/0113922 A1* | 5/2011 | Pesola | ..................... | B60K 6/36 74/665 A |
| 2011/0113923 A1 | 5/2011 | Pesola et al. | | |

\* cited by examiner

DOUBLE CLUTCH TRANSMISSION

CROSS-REFERENCE TO RELATED APPLICATION

This application claims the benefit of priority to Korean Patent Application No. 10-2012-0143099 filed in the Korean Intellectual Property Office on Dec. 10, 2012, the entire contents of which are incorporated herein by reference.

TECHNICAL FIELD

The present disclosure relates to a double clutch transmission. More particularly, the present disclosure relates to a double clutch transmission which achieves smooth starting and shifting by additionally mounting a motor/generator, improves fuel economy through regenerative braking, and improves acceleration performance of a vehicle by receiving torque of a motor during acceleration.

BACKGROUND

Environmentally-friendly technology for vehicles is a very important technology on which survival of future motor industry is dependent. Vehicle manufacturers are focusing on development of environmentally-friendly vehicles so as to meet environment and fuel consumption regulations.

Some examples of future vehicle technologies are an electric vehicle (EV) and a hybrid electric vehicle (HEV) using electrical energy and double clutch transmission (DCT) to improve efficiency and convenience.

The DCT includes two clutches and a gear train applied to a manual transmission. The DCT selectively transmits torque input from an engine to two input shafts by using the two clutches, changes a speed by using the gear train, and outputs the torque.

The DCT is one type of automated manual transmissions (AMT). It realizes a compact transmission having more than five forward speeds. Since the two clutches and synchronizers are controlled by a controller according to the DCT, manual shift maneuver is unnecessary for controlling the DCT.

The DCT, compared with an automatic transmission using planetary gear sets, has excellent power delivery efficiency, and implementation of additional components is simple. Therefore, the DCT can meet fuel consumption regulations, and multi-speeds efficiency may be improved.

However, the vehicle having the conventional DCT may not achieve smooth starting and may roll back when the vehicle starts on an uphill due to slipping of a friction clutch. Heat capacity of the clutch according to the conventional DCT may cause shift shock since shift time needs to be shortened.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a double clutch transmission having advantages of achieving smooth starting and shifting of a vehicle by additionally mounting a motor/generator, improving fuel economy through regenerative braking, and improving acceleration performance of the vehicle by receiving torque of a motor during acceleration.

A double clutch transmission according to an exemplary embodiment of the present disclosure may include a variable connector comprising a first clutch and a second clutch and selectively outputting torque of an engine through the first and second clutches. An input driver includes a first input shaft selectively connected to the engine through the first clutch and provided with a plurality of input gears fixedly disposed on an exterior circumference thereof, and a second input shaft selectively connected to the engine through the second clutch and provided with a plurality of input gears fixedly disposed on an exterior circumference thereof. A speed output driver includes a first output shaft disposed in parallel with the first and second input shafts, a first speed output disposed on the first output shaft and provided with first and second synchronizers, a second output shaft disposed in parallel with the first and second input shafts, and a second speed output disposed on the second output shaft and provided with third and fourth synchronizers. A reverse speed/motor driver is disposed between the input driver and the speed output driver, achieves a reverse speed by transmitting torque input from the input driver to the speed output driver, and assists the torque of the engine or performing regenerative braking.

The second input shaft may be a hollow shaft, and a portion of the first input shaft may be inserted in the second input shaft without rotational interference with the second input shaft.

First, second, third, and fourth input gears for odd-numbered speeds may be disposed on the first input shaft, and fifth and sixth input gears for the reverse speed and even-numbered speeds may be disposed on the second input shaft.

The first, second, third, and fourth input gears may be disposed on the first input shaft in a named sequence from a rear portion to a front portion of the double clutch transmission (DCT).

The fifth and sixth input gears may be disposed on the second input shaft in a named sequence from a rear portion to a front portion of the double clutch transmission (DCT).

The first synchronizer may include a third speed gear engaged with the first input gear and a first speed gear engaged with the third input gear.

The second synchronizer may include a sixth speed gear engaged with the fifth input gear and a second speed gear engaged with the sixth input gear.

The third synchronizer may include a reverse speed gear operably connected to the reverse speed/motor driver and a fourth speed gear engaged with the fifth input gear.

The fourth synchronizer may include a seventh speed gear engaged with the fourth input gear and a fifth speed gear engaged with the second input gear.

The reverse speed/motor driver may include a motor/generator operated as a motor or a generator and provided with a motor/generator drive shaft. A reverse input gear is disposed on the motor/generator drive shaft and engaged with the sixth input gear. An idle gear is disposed on the motor/generator drive shaft and engaged with the reverse speed gear of the third synchronizer.

The double clutch transmission may further include a third clutch selectively connecting the motor/generator with the motor/generator drive shaft.

The double clutch transmission may further include a fifth synchronizer disposed on the motor/generator drive shaft and selectively connecting the first input gear with the motor/generator drive shaft.

The fifth synchronizer may include a transfer gear engaged with the first input gear.

The double clutch transmission may further include a third clutch selectively connecting the motor/generator and the motor/generator drive shaft.

A double clutch transmission according to another exemplary embodiment of the present disclosure may include a first clutch connected to an engine and selectively outputting torque of the engine. A second clutch is connected to the engine and selectively outputs the torque of the engine. A first input shaft selectively receives the torque of the engine through the first clutch and provided with first, second, third, and fourth input gears disposed on an exterior circumference thereof. A second input shaft may be a hollow shaft, selectively receives the torque of the engine through the second clutch and provided with fifth and sixth input gears disposed on an exterior circumference thereof, wherein a portion of the first input shaft is inserted in the second input shaft. First and second output shafts are disposed in parallel with the first and second input shafts. A first synchronizer is disposed on the first output shaft and includes a third speed gear engaged with the first input gear and a first speed gear engaged with the third input gear. A second synchronizer is disposed on the first output shaft and includes a sixth speed gear engaged with the fifth input gear and a second speed gear engaged with the sixth input gear. A third synchronizer is disposed on the second output shaft and includes a reverse speed gear and a fourth speed gear engaged with the fifth input gear. A fourth synchronizer is disposed on the second output shaft and includes a seventh speed gear engaged with the fourth input gear and a fifth speed gear engaged with the second input gear. A motor/generator operates as a motor or a generator and is provided with a motor/generator drive shaft. A reverse input gear is disposed on the motor/generator drive shaft and engaged with the sixth input gear. An idle gear is disposed on the motor/generator drive shaft and engaged with the reverse speed gear.

The double clutch transmission may further include a third clutch selectively connecting the motor/generator with the motor/generator drive shaft.

The double clutch transmission may further include a fifth synchronizer disposed on the motor/generator drive shaft and selectively connecting the first input gear with the motor/generator drive shaft.

The fifth synchronizer may include a transfer gear engaged with the first input gear.

The double clutch transmission may further include a third clutch selectively connecting the motor/generator and the motor/generator drive shaft.

DETAILED DESCRIPTION OF THE EMBODIMENTS

Figure 1:
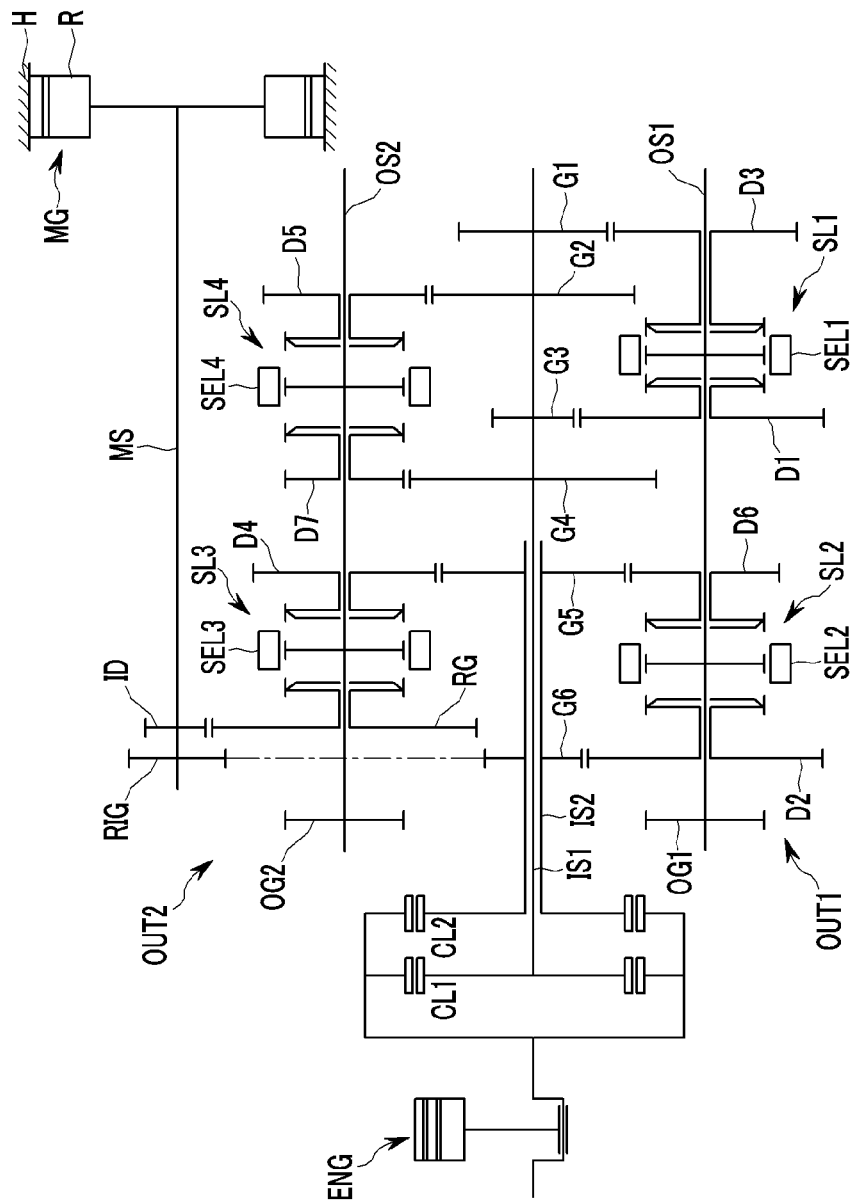
FIG. 1 is a schematic diagram of a double clutch transmission according to a first exemplary embodiment of the present disclosure.

Exemplary embodiments of the present disclosure will hereinafter be described in detail with reference to the accompanying drawings.

Description of components that are not necessary for explaining the present disclosure will be omitted, and the same constituent elements are denoted by the same reference numerals.

In the detailed description, ordinal numbers are used for distinguishing constituent elements having the same terms, and have no specific meanings.

FIG. 1 is a schematic diagram of a double clutch transmission according to a first exemplary embodiment of the present disclosure.

Referring to FIG. 1, a double clutch transmission according to a first exemplary embodiment of the present disclosure includes a variable connector CL1 and CL2, an input driver IS1 and IS2, a speed output driver OUT1 and OUT2, and a reverse speed/motor driver MG, MS, ID, and RIG.

The variable connector includes first and second clutches CL1 and CL2.

The first clutch CL1 and the second clutch CL2 selectively transmit torque of an engine ENG respectively to first and second input shafts IS1 and IS2.

The first clutch CL1 selectively connects the first input shaft IS1 with an output side of the engine ENG, and the second clutch CL2 selectively connects the second input shaft IS2 with the output side of the engine ENG.

The first and second clutches CL1 and CL2 forming the variable connector may be conventional wet type multi-plate clutches and are controlled by a hydraulic control system (not shown).

The input driver includes the first and second input shafts IS1 and IS2. The second input shaft IS2 is a hollow shaft, and a portion of the first input shaft IS1 is inserted in the second input shaft IS2 without rotational interference with the second input shaft IS2.

The first input shaft IS1 is connected to the engine ENG through the first clutch CL1, and first, second, third, and fourth input gears G1, G2, G3, and G4 are disposed on an exterior circumference of the first input shaft IS1 in a named sequence from a rear portion (the right side in the drawing) to a front portion of the double clutch transmission (DCT). The first, second, third, and fourth input gears G1, G2, G3, and G4 are disposed on a portion where the first input shaft IS1 does not overlap with the second input shaft IS2.

The second input shaft IS2 is connected to the engine ENG through the second clutch CL2, and fifth and sixth input gears G5 and G6 are disposed on an exterior circumference of the second input shaft IS2 in a named sequence from a rear portion to a front portion of the DCT.

The first, second, third, fourth, fifth, and sixth input gears G1, G2, G3, G4, G5, and G6 are input gears operating at different speed. That is, the first input gear G1 operates at a third forward speed, the second input gear G2 operates at a fifth forward speed, the third input gear G3 operates at a first forward speed, the fourth input gear G4 operates at a seventh forward speed, the fifth input gear G5 operates at a fourth forward speed and a sixth forward speed, and the sixth input gear G6 operates at a second forward speed and a reverse speed.

Here, the input gears for odd-numbered speeds are disposed on the first input shaft IS1, and the input gears for even-numbered speeds and the reverse speed are disposed on the second input shaft IS2.

The speed output driver includes first and second speed outputs OUT1 and OUT2 disposed in parallel with the first and second input shafts IS1 and IS2.

The first speed output OUT1 includes a first output shaft OS1 disposed in parallel with the first and second input shafts IS1 and IS2, a first synchronizer SL1 including a first speed gear D1 and a third speed gear D3, and a second synchronizer SL2 including a second speed gear D2 and a sixth speed gear D6.

The first synchronizer SL1 is disposed on a rear portion of the first output shaft OS1, and the second synchronizer SL2 is disposed on a front portion of the first output shaft OS1.

The first speed gear D1 of the first synchronizer SL1 is engaged with the third input gear G3, and the third speed gear D3 of the first synchronizer SL1 is engaged with the first input gear G1.

The second speed gear D2 of the second synchronizer SL2 is engaged with the sixth input gear G6, and the sixth speed gear D6 of the second synchronizer SL2 is engaged with the fifth input gear G5.

In addition, torque converted by the first speed output OUT1 is transmitted to a conventional differential through a first output gear OG1 mounted at a front end portion of the first output shaft OS1.

The second speed output OUT2 includes a second output shaft OS2 disposed in parallel with the first and second input shafts IS1 and IS2, a third synchronizer SL3 including a fourth speed gear D4 and a reverse speed gear RG, and a fourth synchronizer SL4 including a fifth speed gear D5 and a seventh speed gear D7.

The third synchronizer SL3 is disposed on a front portion of the second output shaft OS2, and the fourth synchronizer SL4 is disposed on a rear portion of the second output shaft OS2.

The fourth speed gear D4 of the third synchronizer SL3 is engaged with the fifth input gear G5.

The fifth speed gear D5 of the fourth synchronizer SL4 is engaged with the second input gear G2, and the seventh speed gear D7 of the fourth synchronizer SL4 is engaged with the fourth input gear G4.

In addition, torque converted by the second speed output OUT2 is transmitted to the conventional differential through the second output gear OG2 mounted at a front end portion of the second output shaft OS2.

The reverse speed/motor driver includes a motor/generator MG operated as a motor or a generator, and an idle gear ID and a reverse input gear RIG integrally formed with a motor/generator drive shaft MS.

The idle gear ID is engaged with the reverse speed gear RG, and the reverse input gear RIG is engaged with the sixth input gear G6. Therefore, if the second input shaft IS2 rotates, torque of the sixth input gear G6 is transmitted to the reverse input gear RIG as an inverse rotation speed, and the inverse rotation speed is transmitted to the reverse speed gear RG through the idle gear ID and then transmitted to the conventional differential through the second output shaft OS2.

Herein, a synchronizer means a device which operably connects two members which can rotate relatively and may include a synchromesh, a dog clutch, a clutch and so on. Since the first, second, third, and fourth synchronizers SL1, SL2, SL3, and SL4 are well known to a person of an ordinary skill in the art, detailed description thereof will be omitted. In addition, sleeves SEL1, SEL2, SEL3, and SEL4 applied respectively to the first, second, third, and fourth synchronizers SL1, SL2, SL3, and SL4, as well known to a person of an ordinary skill in the art, are operated by additional actuators (not shown), wherein the actuators are controlled by a transmission control unit (TCU).

The motor/generator MG may generate electricity by the torque of the engine ENG or energy in regenerative braking and may charge a battery. On the contrary, the motor/generator MG may be driven by power of the battery and may assist the torque of the engine ENG or may be used as an independent power source.

Shifting processes of the double clutch transmission according to a first exemplary embodiment of the present disclosure will be described.

[Starting at Reverse Speed]

If the second clutch CL2 is operated after the second output shaft OS2, and the reverse speed gear RG are operably connected by the sleeve SEL3 of the third synchronizer SL3, shifting to the reverse speed is achieved.

When the reverse speed starts, if torque of the motor/generator MG is used as auxiliary torque during slipping of the second clutch CL2, smooth starting at the reverse speed may be achieved.

[Starting at Forward Speed]

The second clutch CL2 is operated after the second speed gear D2, and the first output shaft OS1 are operably connected by the sleeve SEL2 of the second synchronizer SL2 when the forward speed starts. Then, the vehicle begins to run at the second forward speed.

When the forward speed starts, if the torque of the motor/generator MG is used as the auxiliary torque during slipping of the second clutch CL2, smooth starting at the forward speed may be achieved.

[First Forward Speed]

At the first forward speed, the first speed gear D1 and the first output shaft OS1 are operably connected by the sleeve SEL1 of the first synchronizer SL1. After that, the first clutch CL1 is operated. Then, shifting to the first forward speed is achieved.

[Second Forward Speed]

If vehicle speed increases at the first forward speed and shifting to the second forward speed is necessary, the second speed gear D2 and the first output shaft OS1 are operably connected by the sleeve SEL2 of the second synchronizer SL2. The first clutch CL1 is released, and the second clutch CL2 is operated. Then, the shifting to the second forward speed is achieved.

After the shifting to the second forward speed is completed, the sleeve SEL1 of the first synchronizer SL1 moves to a neutral position.

[Third Forward Speed]

If the vehicle speed increases at the second forward speed and shifting to the third forward speed is necessary, the third speed gear D3 and the first output shaft OS1 are operably connected by the sleeve SEL1 of the first synchronizer SL1. The second clutch CL2 is released and the first clutch CL1 is operated. Then, the shifting to the third forward speed is achieved.

After the shifting to the third forward speed is completed, the sleeve SEL2 of the second synchronizer SL2 is moved to the neutral position.

[Fourth Forward Speed]

If the vehicle speed increases at the third forward speed and shifting to the fourth forward speed is necessary, the fourth speed gear D4 and the second output shaft OS2 are operably connected by the sleeve SEL3 of the third synchronizer SL3. The first clutch CL1 is released, and the second clutch CL2 is operated. Then, the shifting to the fourth forward speed is achieved.

After the shifting to the fourth forward speed is completed, the sleeve SEL1 of the first synchronizer SL1 moves to the neutral position.

[Fifth Forward Speed]

If the vehicle speed increases at the fourth forward speed, and shifting to the fifth forward speed is necessary, the fifth speed gear D5 and the second output shaft OS2 are operably connected by the sleeve SEL4 of the fourth synchronizer SL4. The second clutch CL2 is released, and the first clutch CL1 is operated. Then, the shifting to the fifth forward speed is achieved.

After the shifting to the fifth forward speed is completed, the sleeve SEL3 of the third synchronizer SL3 moves to the neutral position.

[Sixth Forward Speed]

If the vehicle speed increases at the fifth forward speed and shifting to the sixth forward speed is necessary, the sixth speed gear D6 and the first output shaft OS1 are operably connected by the sleeve SEL2 of the second synchronizer SL2. The first clutch CL1 is released, and the second clutch CL2 is operated. Then, the shifting to the sixth forward speed is achieved.

After the shifting to the sixth forward speed is completed, the sleeve SEL4 of the fourth synchronizer SL4 moves to the neutral position.

[Seventh Forward Speed]

If the vehicle speed increases at the sixth forward speed and shifting to the seventh forward speed is necessary, the seventh speed gear D7 and the second output shaft OS2 are operably connected by the sleeve SEL4 of the fourth synchronizer SL4. The second clutch CL2 is released, and the first clutch CL1 is operated. Then, the shifting to the seventh forward speed is achieved.

After the shifting to the seventh forward speed is completed, the sleeve SEL2 of the second synchronizer SL2 moves to the neutral position.

The driving torque of the motor/generator MG can be used independently or used as the auxiliary torque of the engine ENG at the even-numbered speeds in the shifting process.

Regenerative braking is possible in deceleration, and the motor/generator MG is used as the generator when the torque of the engine ENG is excessively generated. Therefore, fuel economy may be improved. In addition, if the motor/generator MG is used during slipping of the clutch in shifting and starting process, smooth starting and shifting may be achieved.

Figure 2:
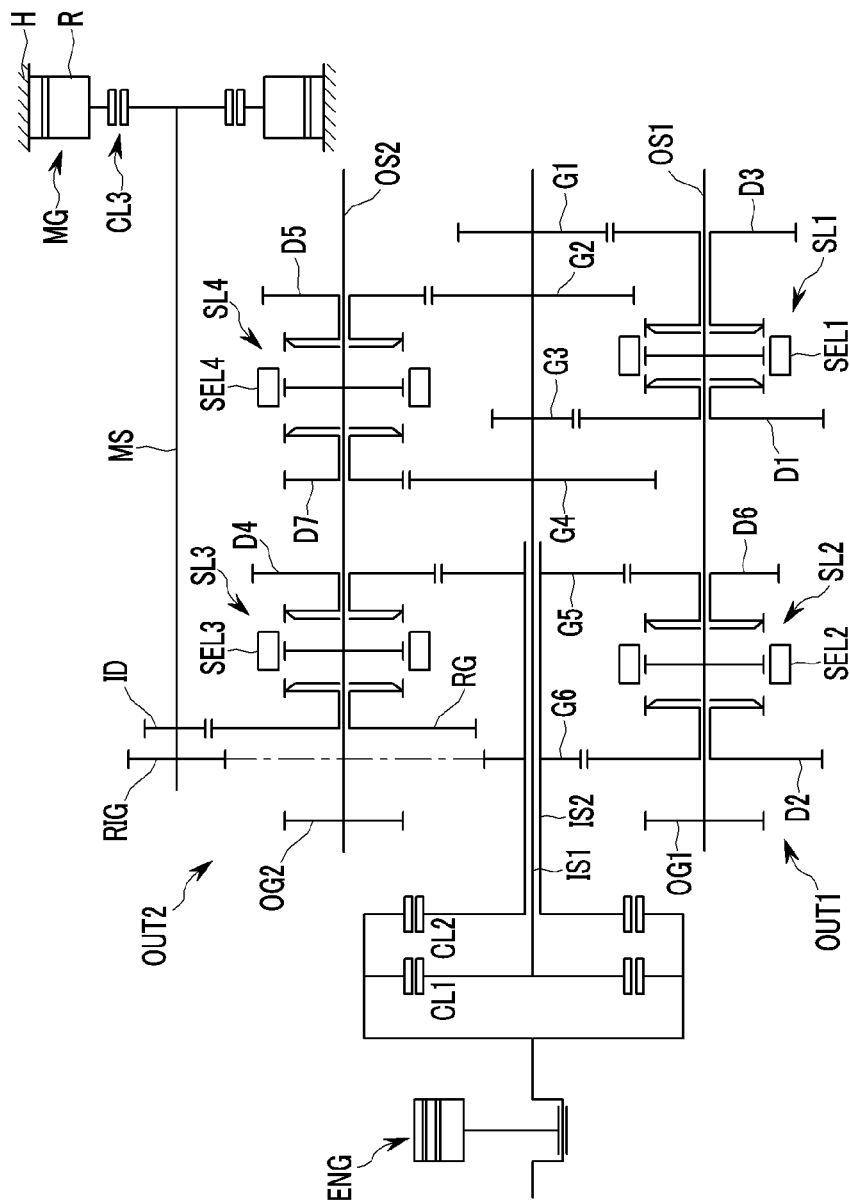
FIG. 2 is a schematic diagram of a double clutch transmission according to a second exemplary embodiment of the present disclosure.

FIG. 2 is a schematic diagram of a double clutch transmission according to a second exemplary embodiment of the present disclosure.

Referring to FIG. 2, a third clutch CL3 is disposed between the motor/generator MG and the motor/generator drive shaft MS in a second exemplary embodiment.

Since the motor/generator drive shaft MS is directly connected to a rotor R of the motor/generator MG in a first exemplary embodiment, the rotor R is rotated though the motor/generator MG that does not operate. However, unnecessary rotation of the rotor R may be prevented according to a second exemplary embodiment.

Figure 3:
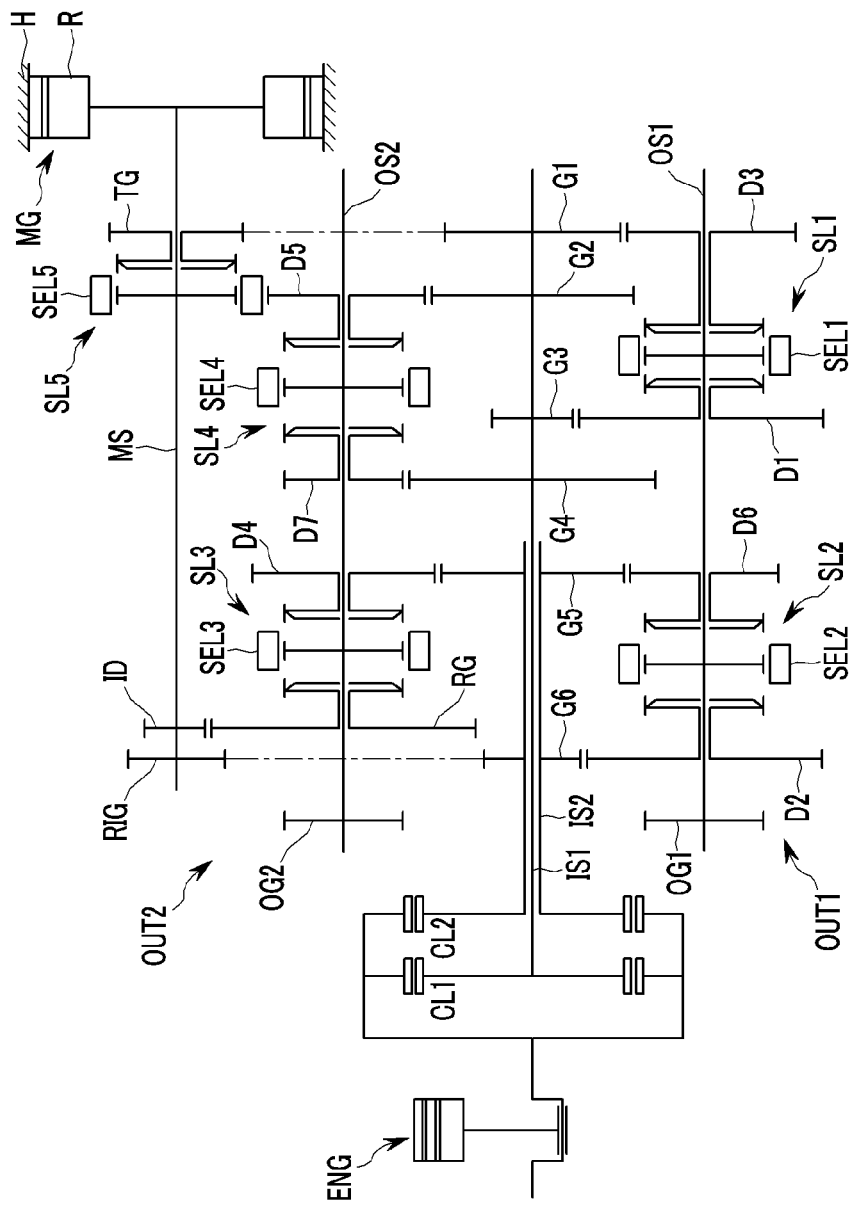
FIG. 3 is a schematic diagram of a double clutch transmission according to a third exemplary embodiment of the present disclosure.

FIG. 3 is a schematic diagram of a double clutch transmission according to a third exemplary embodiment of the present disclosure.

Referring to FIG. 3, a fifth synchronizer SL5 is disposed on the motor/generator drive shaft MS, and the fifth synchronizer SL5 selectively connects the motor/generator drive shaft MS with the first input shaft IS1 in a third exemplary embodiment.

The fifth synchronizer SL5 includes a transfer gear TG disposed on the motor/generator drive shaft MS and engaged with the first input gear G1, and a fifth sleeve SEL5 selectively connects the transfer gear TG with the motor/generator drive shaft MS.

Therefore, the motor/generator drive shaft MS can be connected to the first input shaft IS1 through the fifth synchronizer SL5 in a state of being connected to the second input shaft IS2 through the reverse input gear RIG in a third exemplary embodiment. Therefore, the motor/generator MG may be efficiently used at both of the even-numbered speeds and the odd-numbered speeds.

Figure 4:
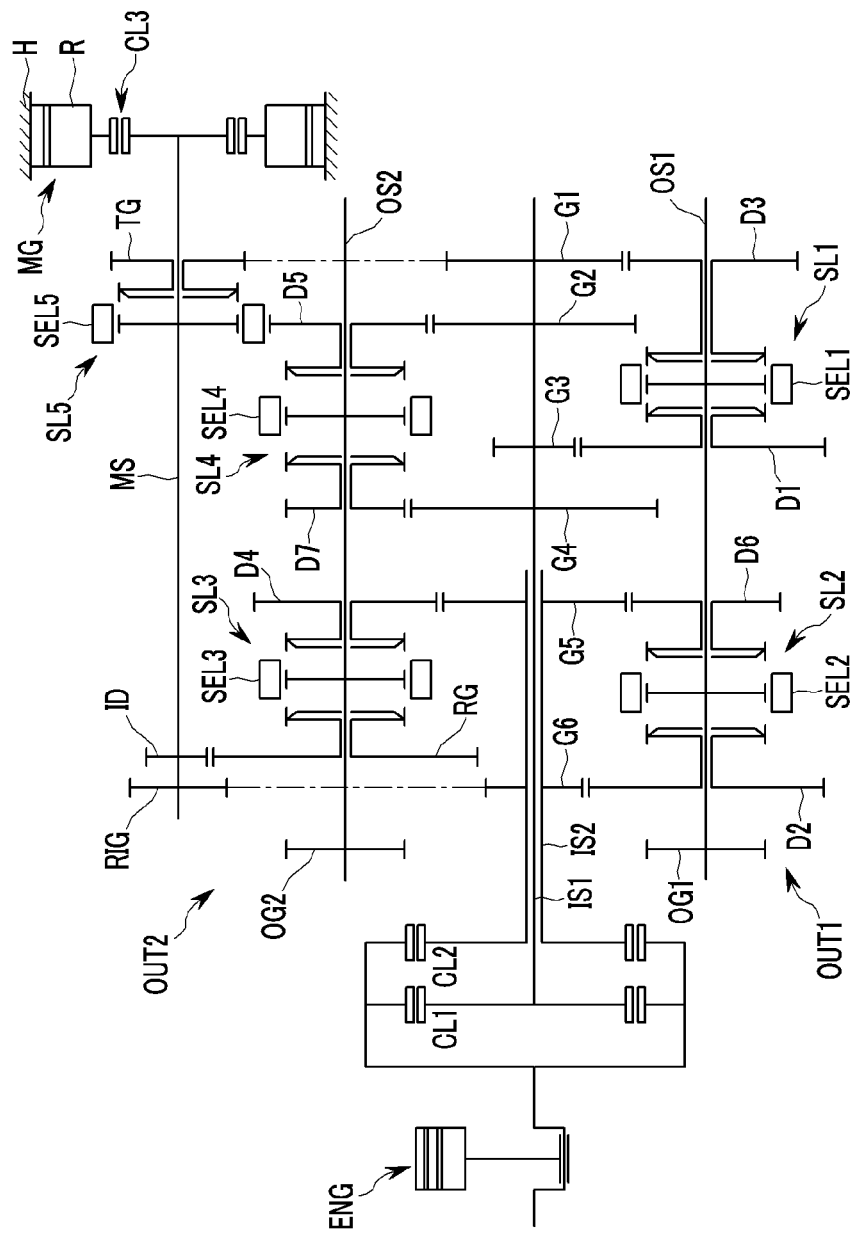
FIG. 4 is a schematic diagram of a double clutch transmission according to a fourth exemplary embodiment of the present disclosure.

FIG. 4 is a schematic diagram of a double clutch transmission according to a fourth exemplary embodiment of the present disclosure.

Referring to FIG. 4, in a fourth exemplary embodiment, compared with a third exemplary embodiment, the third clutch CL3 is disposed between the motor/generator MG and the motor/generator drive shaft MS.

Since the motor/generator drive shaft MS is directly connected to the rotor R of the motor/generator MG in a third exemplary embodiment, the rotor R is rotated though the motor/generator MG that does not operate. However, unnecessary rotation of the rotor R may be prevented in a fourth exemplary embodiment.

Smooth starting and shifting may be achieved by additionally mounting a motor/generator, fuel economy may be improved through regenerative braking, and acceleration performance of the vehicle may be improved by receiving torque of a motor during acceleration according to the exemplary embodiments of the present disclosure.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A double clutch transmission comprising:
a variable connector including a first clutch and a second clutch and selectively outputting a torque of an engine through the first clutch and the second clutch;
an input driver including a first input shaft selectively connected to the engine through the first clutch and provided with a plurality of input gears fixedly disposed on an exterior circumference thereof, and a second input shaft selectively connected to the engine through the second clutch and provided with a plurality of input gears fixedly disposed on an exterior circumference thereof;
a speed output driver including a first output shaft disposed in parallel with the first and second input shafts, a first speed output disposed on the first output shaft and provided with first and second synchronizers, a second output shaft disposed in parallel with the first and second input shafts, and a second speed output disposed on the second output shaft and provided with third and fourth synchronizers; and
a reverse speed/motor driver disposed between the input driver and the speed output driver, achieving a reverse speed by transmitting torque from the input driver to the speed output driver, assisting the torque of the engine or performing regenerative braking,
wherein first, second, third, and fourth input gears for odd-numbered speeds are disposed on the first input shaft, and fifth and sixth input gears for the reverse speed and even-numbered speeds are disposed on the second input shaft, and
wherein the reverse speed/motor driver comprises: a motor/generator operated as a motor or a generator and provided with a motor/generator drive shaft; a reverse input gear disposed on the motor/generator drive shaft and engaged with the sixth input gear; and an idle gear disposed on the motor/generator drive shaft and engaged with the reverse speed gear of the third synchronizer.

2. The double clutch transmission of claim 1, wherein the second input shaft is a hollow shaft, and a portion of the first input shaft is inserted in the second input shaft without rotational interference with the second input shaft.

3. The double clutch transmission of claim 1, wherein the first, second, third, and fourth input gears are disposed on the first input shaft in a sequence of the first, second, third, and fourth input gears from a rear portion to front portion of the double clutch transmission (DCT).

4. The double clutch transmission of claim 1, wherein the fifth and sixth input gears are disposed on the second input shaft in a sequence of the fifth and sixth input gears from a rear portion to front portion of the DCT.

5. The double clutch transmission of claim 1, wherein the first synchronizer includes a third speed gear engaged with the first input gear and a first speed gear engaged with the third input gear.

6. The double clutch transmission of claim 1, wherein the second synchronizer includes a sixth speed gear engaged with the fifth input gear and a second speed gear engaged with the sixth input gear.

7. The double clutch transmission of claim 1, wherein the third synchronizer includes a reverse speed gear operably connected to the reverse speed/motor driver and a fourth speed gear engaged with the fifth input gear.

8. The double clutch transmission of claim 1, wherein the fourth synchronizer includes a seventh speed gear engaged with the fourth input gear and a fifth speed gear engaged with the second input gear.

9. The double clutch transmission of claim 1, further comprising a third clutch selectively connecting the motor/generator with the motor/generator drive shaft.

10. The double clutch transmission of claim 1, further comprising a fifth synchronizer disposed on the motor/generator drive shaft and selectively connecting the first input gear with the motor/generator drive shaft.

11. The double clutch transmission of claim 10, wherein the fifth synchronizer includes a transfer gear engaged with the first input gear.

12. The double clutch transmission of claim 10, further comprising a third clutch selectively connecting the motor/generator and the motor/generator drive shaft.

13. A double clutch transmission comprising:
a first clutch connected to an engine and selectively outputting torque of the engine;
a second clutch connected to the engine and selectively outputting the torque of the engine;
a first input shaft selectively receiving the torque of the engine through the first clutch and provided with first, second, third, and fourth input gears disposed on an exterior circumference thereof;
a second input shaft being a hollow shaft, selectively receiving the torque of the engine through the second clutch, and provided with fifth and sixth input gears disposed on an exterior circumference thereof,
wherein a portion of the first input shaft is inserted in the second input shaft;
first and second output shafts disposed in parallel with the first and second input shafts;
a first synchronizer disposed on the first output shaft, and including a third speed gear engaged with the first input gear and a first speed gear engaged with the third input gear;
a second synchronizer disposed on the first output shaft, and including a sixth speed gear engaged with the fifth input gear and a second speed gear engaged with the sixth input gear;
a third synchronizer disposed on the second output shaft, and including a reverse speed gear and a fourth speed gear engaged with the fifth input gear;
a fourth synchronizer disposed on the second output shaft, and including a seventh speed gear engaged with the fourth input gear and a fifth speed gear engaged with the second input gear;
a motor/generator operated as a motor or a generator and provided with a motor/generator drive shaft;
a reverse input gear disposed on the motor/generator drive shaft and engaged with the sixth input gear; and
an idle gear disposed on the motor/generator drive shaft and engaged with the reverse speed gear.

14. The double clutch transmission of claim 13, further comprising a third clutch selectively connecting the motor/generator with the motor/generator drive shaft.

15. The double clutch transmission of claim 13, further comprising a fifth synchronizer disposed on the motor/generator drive shaft and selectively connecting the first input gear with the motor/generator drive shaft.

16. The double clutch transmission of claim 15, wherein the fifth synchronizer includes a transfer gear engaged with the first input gear.

17. The double clutch transmission of claim 15, further comprising a third clutch selectively connecting the motor/generator and the motor/generator drive shaft.

* * * * *